United States Patent [19]

Soepenberg et al.

[11] 4,384,963

[45] May 24, 1983

[54] DRILLING MUD COMPOSITION CONTAINING A STARCH PRODUCT AND A METHOD FOR DRILLING A WELL

[75] Inventors: Jan Soepenberg; Gerrit Soepenberg; Albert Laarman, all of Swifterbant, Netherlands

[73] Assignee: Gebr. Soepenberg B.V., Dronten, Netherlands

[21] Appl. No.: 158,367

[22] Filed: Jun. 11, 1980

[30] Foreign Application Priority Data

Jun. 14, 1979 [NL] Netherlands ............ 7904667

[51] Int. Cl.³ ............................................. C09K 7/02
[52] U.S. Cl. ...................... 252/8.5 C; 127/32; 127/66; 252/8.5 A
[58] Field of Search .......... 252/8.5 A, 8.5 C, 8.5 LC; 127/66, 32

[56] References Cited

U.S. PATENT DOCUMENTS

| 2,399,986 | 5/1946 | Chapman | 252/8.5 |
|---|---|---|---|
| 2,417,307 | 3/1947 | Larsen | 252/8.5 |
| 2,525,783 | 10/1950 | Farrow | 252/8.5 |
| 2,548,263 | 10/1951 | Hoogezand et al. | 127/32 |
| 2,773,783 | 12/1956 | Lunstroth | 127/32 |
| 2,798,011 | 7/1957 | Fontein et al. | 127/66 |
| 2,908,597 | 10/1959 | Owen | 127/71 |
| 3,018,245 | 1/1962 | Owen | 252/8.5 |
| 3,433,668 | 3/1969 | Hein | 127/66 X |

FOREIGN PATENT DOCUMENTS 5099 3/1916 United Kingdom ................ 127/66

OTHER PUBLICATIONS

Rogers, *Composition and Properties of Oil Well Drilling Fluids*, Second Edition, Pub. 1953, pp. 408-414.

Primary Examiner—Herbert B. Guynn
Attorney, Agent, or Firm—Bucknam and Archer

[57] ABSTRACT

A starch product suitable for use in drilling muds, a method for producing the same, a drilling mud containing said product and a method for drilling a well.

The starch product is obtained by drying the debris recovered from peeling potatoes. The production is preferably performed by washing the potatoes (50) and peeling them (51), yielding rasped potatoes (56) and peel debris (51a). A great part of the water contained in said peel debris (51a) is removed in a decanter (52) and the remainder is subsequently dried (53), yielding the product (55).

2 Claims, 2 Drawing Figures

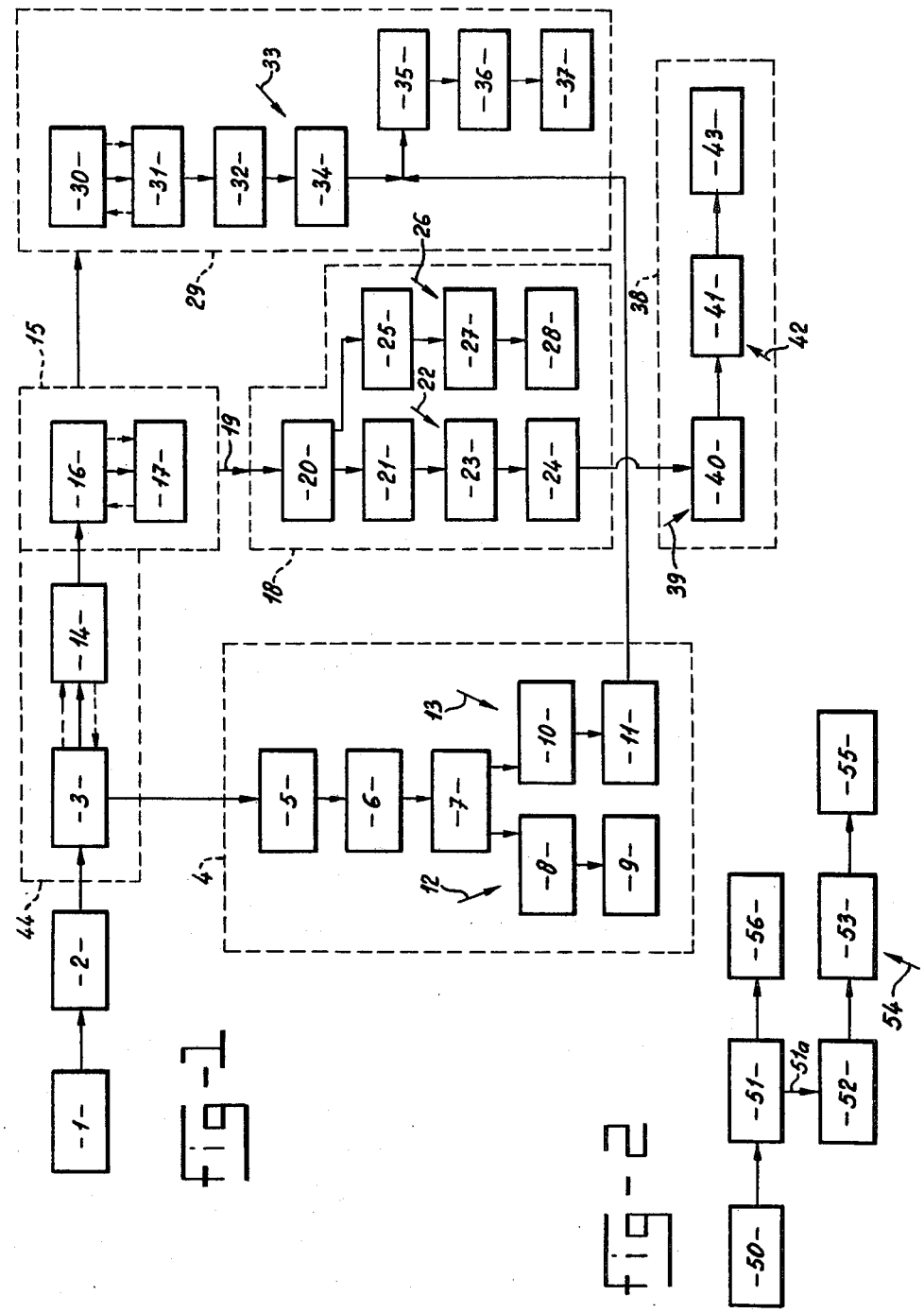

DRILLING MUD COMPOSITION CONTAINING A STARCH PRODUCT AND A METHOD FOR DRILLING A WELL

The invention relates to a starch product suitable for use in drilling muds, to a method for producing the same, to a drilling mud containing said product and to a method for drilling a well.

It is known in general to use starch derivatives in drilling muds (vide e.g. Petroleumhandbook, 1948, page 86). The requirements to be met by such a product are specified in OCMA (Oil Companies Materials Association) specification number DFCB—5 revised in October 1973.

The most important requirements are that the starch product shall be a free flowing powder and free from lumps. Upon treatment of a standard slurry having an API filtrate loss of approximately 20 ml, the viscosity of the suspension treated with starch (15 g of starch per liter) shall not exceed 35 cP and the corrected API filtrate loss shall not exceed 7 ml.

Up to now the product used for the aforesaid purpose has been prepared in way commonly used for the production of starch products. In such a production the potatoes are first of all ground finely in order to sever the fibrous cell containing the starch grains. Thereupon the starch grains and the juice are removed from the cells by rinsing with much water. By means of decanters the starch and the fibres are separated from the juice containing dissolved salts, sugars, proteins and fats. The starch and the fibres are then separated from the liquid yet present by means of a screen belt and by compression followed by a fibre extraction. In the fibre extraction the fibres are separated from the starch. Thereafter the starch is refined and dried. For the preparation of drilling muds the recovered starch is slurried in water again and subsequently heat dried. During this heat drying a gelatification will of course occur. Upon drying there is obtained the product used in drilling muds.

Surprisingly it has now been found that when drying the peel debris of the potatoes there may be obtained directly a starch product suitable for use in drilling muds. This product possesses even better properties than the product prepared in the usual way. It is quite surprising that a product suitable for use in drilling muds may be obtained directly by drying the peel debris the composition of which naturally differs from the composition of the starch recovered from the potato in that the debris comprises also other components of which in particular proteins, fats, peel fragments, cellulose and fibrous material may be mentioned.

The method according to the invention entails a considerable decrease of energy consumption as will become apparant from the block diagrams represented in FIGS. 1 and 2.

With reference to FIG. 1 there has been shown a block diagram of a modern starch plant applying tuber juice extraction. When applying the known method there will be first the starch production followed by slurrying the starch thus produced in water and conversion thereof into a drilling mud product. The figures indicated in the diagram are based on a production starting from 1 metric ton of potatoes.

With reference to FIG. 2 there has been shown a block diagram of the method according to the invention. The figures indicated in this diagram are likewise based on a production starting from 1 metric ton of potatoes. It is clear that when applying the known method there is obtained 50 kg of product in total while using 160 kg of steam in the pertaining step. However when applying the method according to the invention there is obtained 50 kg of product while using 110 kg of steam. In these block diagrams the numeral have the following significances:

(1) washing units
(2) rasping units
(3) decanters
(4) protein plant
(5) ultrafiltration
(6) coagulation
(7) decanters
(8) drier
(9) protein 13 kg
(10) evaporation
(11) concentrate 40 kg (product protein)
(12) 60 kg of steam
(13) 200 kg of steam
(14) two-step screen belt presses
(15) fibre extraction
(16) four-step centrifuging
(17) four-step separators
(18) refining
(19) potato starch
(20) separators
(21) vacuum filters
(22) 250 kg of steam
(23) starch driers
(24) potato starch 200 kg
(25) vacuum filters
(26) 65 kg of steam
(27) starch drier
(28) B starch 10 kg
(29) fibre draining and drying
(30) centrifuging
(31) separators
(32) fibre presses
(33) 150 kg of steam
(34) fibre driers 20 kg of fibres
(35) blending
(36) granulate driers
(37) cattle feed
(38) drilling mud additive production
(39) 65 l of water and 60 kg of starch
(40) slurrying of starch 125 kg
(41) drying process
(42) 90 kg of steam
(43) drilling mud product 50 kg
(44) tuber juice extraction
(50) washing unit
(51) peeling of tubers
(51a) peel debris
(52) decanters
(53) drying process
(54) 110 kg of steam
(55) 50 kg of drilling mud product
(56) 500 kg of rasped potatoes.

The process according to the present invention is illustrated in FIG. 2 and consists of washing the potatoes (50), peeling them (51), yielding rasped potatoes (56) and peel debris (51a). A great part of the water contained in the peel debris is removed in decanters (52) and the residue is dried (53). The product is designated by numeral 55.

For simplicity's sake it has been indicated in the diagram that the drying operation is performed by means of a decanter and a drying process (drying roll). Of course the manner in which the drying is performed, is not of importance per se. The decanter might for instance be omitted and replaced by roll drying directly although this would lead to a higher energy consumption. Likewise use may be made of a so-called extruder. Any other way of predrying may of course be employed instead of using a decanter.

It is self evident that other substances may be added to the product of the invention as is done usually in case of starch products destined for use in drilling muds.

As examples of such additives there may be mentioned potassium persulfate, borax and magnesium sulfate.

Where in wet condition the product may be subject to attack by microorganisms it may be appropiate to add a small amount of preservative. As examples of preservatives there may be mentioned pentachlorometacresol and pentachlorophenol. Of course other preservatives may be used too.

These substances may be blended with the product according to the invention in a way known per se.

In as far the product obtained from the drying roll is too coarse this product may be subjected to a size-reduction by grinding. The product may also be stored as such and be ground at a later time.

It is not required that the different steps of the method are performed in succession directly. An intermediate storage may be used.

EXAMPLES

The debris obtained by peeling potatoes in the usual way is decanted and then dried on a steamheated drum-drier. Thereafter the product thus obtained is ground is a way known per se to form a product meeting the "OCMA-specifications".

Some samples of the product were tested. Upon testing the following results were obtained:

SAMPLE 1

| properties | unit | required | result |
|---|---|---|---|
| appearance |  | freely flowing powder, no lumps | flakes, free from lumps |
| base slurry API filtrate loss | ml | 120 ± 20 | 110 |
| Starch treated slurry apparent viscosity | cP | 35 max. | 28 |
| corrected API filtrate loss | ml | 7 max. | 2.0 |

SAMPLE 2

| properties | unit | required | result |
|---|---|---|---|
| appearance |  | freely flowing powder, no lumps | flakes, free from lumps |
| base slurry | ml | 120 ± 20 | 110 |

SAMPLE 2-continued

| properties | unit | required | result |
|---|---|---|---|
| API filtrate loss |  |  |  |
| Starch treated slurry apparent viscosity | cP | 35 max. | 27 |
| corrected API filtrate loss | ml | 7 max. | 3.0 |

Another sample yielded the following values:

| Test of a salt saturated slurry | | required according to the specification | measured |
|---|---|---|---|
| Base slurry 30 min API filtrate, ml | | 120 ± 20 | 138 |
| Starch treated slurry | Properties upon adding 15 g of starch per liter | | |
|  | Apparent viscosity cPs | 35 max. | 13 |
|  | Corrected API | 7.0 max. | 6.2 |
| Appearance | | freely flowing powder | |

Conclusion: The values meet O.C.M.A. specification No DFCP-5.
Remark: Tested with Clarsol SRC.

Comparative tests were performed for comparing the properties of the product according to the invention with those of known products. In these tests a drilling mud was used prepared from: salt brine +4% by weight of salt resistant clay +20% by weight of protective colloid +0.2% by weight of NaOH.

It should be remarked in this regard that the marketed starch derivatives used for comparison purposes comprise additives for ameliorating the product properties. Such additives may also be used in the product according to the invention. When adding these additives there will be attained of course an amelioration of the properties. This holds in particular with respect to the aging at higher temperature.

Two test samples were prepared for each tested sample. The judgement was made: after 24 hours at 20° C. for the one sample and after 18 hours aging at 120° C. in a roller furnace for the other. The values thus found are apparant from the following table.

Comparison of FLEVOSTARCH (invention) with Boramyl MR, VISCOGEL 618, Stabilose and PHRIKOLAT-starch in a salt brine drilling mud including 4% by weight of Clarsol SRC, 2% by weight of protective colloid and 0.2% by weight of NaOH.

| measurement | FLEVO-STARCH | | BORAMYL MR | | VISCOGEL 618 | | STABILOSE | | PHRIKOLAT-starch | |
|---|---|---|---|---|---|---|---|---|---|---|
| | after 24h aging at 20° C. | after 18h at 120° C. in roller furnace | after 24h aging at 20° C. | after 18h at 120° C. in roller furnace | after 24h aging at 20° C. | after 18h at 120° C. in roller furnace | after 24h aging at 20° C. | after 18h at 120° C. in roller furnace | after 24h aging at 20° C. | after 18h at 120° C. in roller furnace |
| apparent viscosity mPas | 24 | 11 | 5 | 5 | 15 | 5.5 | 9 | 6.5 | 17 | 9 |
| API-water loss ml | 5.8 | 70 | 8.4 | complete destruction of protective colloid | 3.0 | 30 | 5.2 | 11.1 | 4.6 | 17.5 |

We claim:
1. A drilling mud composition which comprises salt brine, a salt-resistant clay, an aqueous base and an amount sufficient to reduce the water loss of a starch product prepared by a process which consists of peeling potatoes, separating the rasped potatoes from the peels, removing water from the peels to obtain a residue and drying to obtain a starch product in the form of lump-free flakes.

2. A method of drilling a well which consists of the steps of:
(1) peeling potatoes and separating the rasped potatoes from potato peels;
(2) removing water from said potato peels to obtain a residue;
(3) drying the residue from step (2) whereby a product free from lumps is obtained;
(4) preparing a drilling mud from salt brine, a salt-resistant clay, an aqueous base and adding thereto said product from step (3) in an amount sufficient to reduce the water loss of said drilling mud; and
(5) inserting said drilling mud into a borehole for drilling a well.

* * * * *